(12) United States Patent
Gramlich

(10) Patent No.: US 7,003,909 B2
(45) Date of Patent: Feb. 28, 2006

(54) IDENTIFICATION DEVICE

(75) Inventor: Gabriele Gramlich, Leverkusen (DE)

(73) Assignee: Gabriele Gramlich, Leverkusen (DE)

( * ) Notice: Subject to any disclaimer, the term of this patent is extended or adjusted under 35 U.S.C. 154(b) by 0 days.

(21) Appl. No.: 10/473,884

(22) PCT Filed: Apr. 4, 2002

(86) PCT No.: PCT/EP02/03744

§ 371 (c)(1),
(2), (4) Date: Apr. 21, 2004

(87) PCT Pub. No.: WO02/081336

PCT Pub. Date: Oct. 17, 2002

(65) Prior Publication Data

US 2004/0168948 A1    Sep. 2, 2004

(30) Foreign Application Priority Data

Apr. 5, 2001   (DE) ................................ 101 16 933

(51) Int. Cl.
*B65D 81/02*    (2006.01)
(52) U.S. Cl. .................. 40/637; 206/459.5; 206/521.1
(58) Field of Classification Search ................ D7/503; 99/498, 582; 206/459.5, 521.2, 521.1; 211/14; 294/1, 1.1; 40/637
See application file for complete search history.

(56) References Cited

U.S. PATENT DOCUMENTS

| 129,632 | A | * | 7/1872 | Washburn | .................... 294/1.1 |
| 2,531,955 | A | * | 11/1950 | Toney | ......................... 211/14 |
| 2,802,686 | A | * | 8/1957 | Ramsey | ...................... 294/1.1 |
| 3,925,890 | A | * | 12/1975 | Frodsham | ..................... 30/141 |
| 4,137,769 | A | * | 2/1979 | Parker | ......................... 374/134 |
| 4,768,362 | A |  | 9/1988 | Schmalz, Jr. | |
| 5,693,352 | A | * | 12/1997 | Vogel Goodman | .......... 426/250 |
| D417,818 | S | * | 12/1999 | Lillelund et al. | ............ D7/503 |
| 6,787,108 | B1 | * | 9/2004 | Ribi | ............................ 422/58 |

FOREIGN PATENT DOCUMENTS

| DE | 25 05 571 | 8/1976 |
| DE | 35 27 892 A1 | 2/1987 |
| WO | WO 00/76883 A1 | 12/2000 |

* cited by examiner

*Primary Examiner*—Mickey Yu
*Assistant Examiner*—Jerrold Johnson
(74) *Attorney, Agent, or Firm*—Venable LLP; Thomas G. Wiseman

(57) ABSTRACT

The invention relates to a device made of an elastic plastic material for the optical and/or haptic marking of hen's eggs to characterize their properties, which device is at least partly adapted to the outer shape of the egg in a positive locking (form-locking) and/or non-positive locking (force-locking) way.

11 Claims, 1 Drawing Sheet

IDENTIFICATION DEVICE

Figure 1:
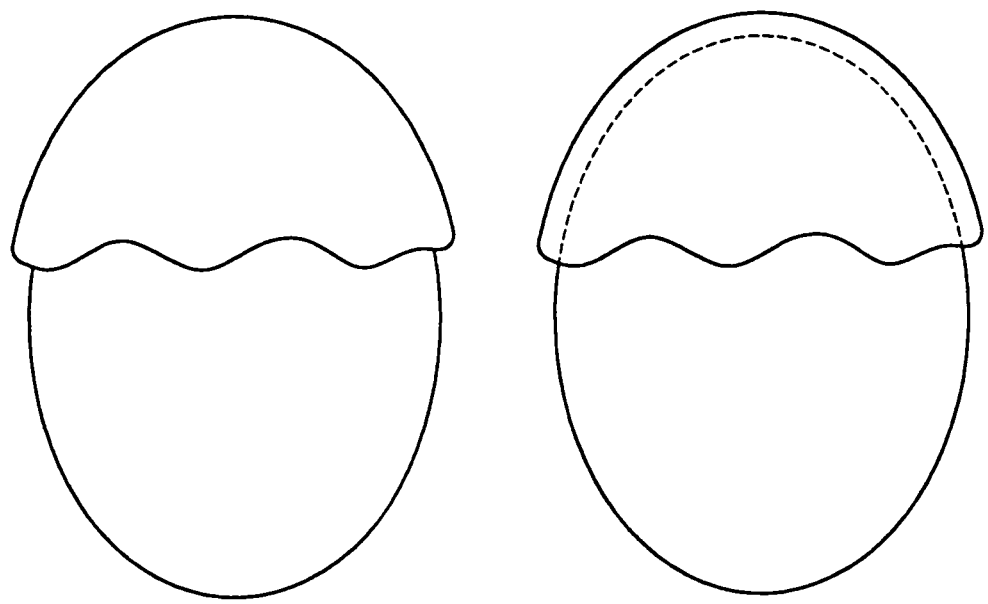

The invention relates to a device for the optical and/or haptic marking of hen's eggs to characterize their properties.

In the household; hen's eggs are usually stored in open or closable egg honeycomb packages or in the egg tray of the refrigerator.

Since eggs are externally similar, there is a problem in recognizing the condition, freshness or quality state of the eggs, especially when different lots having different laying dates are present together, particularly in households with several persons or in flat sharing.

Thus, for example, fresh eggs from outdoor keeping (for immediate eating), eggs from battery keeping (for processing in different meals), older eggs (for processing in different meals) and boiled eggs can be present side by side. For distinction, some eggs are marked with a print by the manufacturer. However, this print is often difficult to read and often cannot be discerned at first sight. Frequently, this print merely describes the country of origin and the keeping place, less frequently the laying date. For eggs from ecological keeping, a corresponding print is not usual at all in Germany.

However, these prints, even if present on every egg, are useless for blind persons and also do not provide any information about the state of the egg, such as boiled or raw.

Egg cozies and eggcups which wholly or partly conform to the egg shape and may have a removable top piece, for example, are already commercially available.

These eggcups/egg cozies consist of rigid, dimensionally stable materials. In addition, egg cozies may consist of textiles. Apart from decorative effects, these products are essentially limited to their respective main functions.

In particular, egg cozies, which are characterized by a heat-insulation material, are not suitable for marking eggs in a space-saving manner in densely packed containers, such as egg honeycomb packages or in the egg tray of the refrigerator.

In addition, these objects of rigid, dimensionally stable materials do not reliably adhere to eggs which are stored in a lying position.

From U.S. Pat. No. 4,768,362, key markers are known which consist of a colored elastic plastic ring which is positively locked around the key bow. These rings can be provided with haptic marks and additionally have an inscription space.

It was the object of the present invention to provide a device which enables one to quickly recognize the condition and/or state of an egg at one sight or by touching. The device is to be space-saving and suitable for usual storage forms, such as egg honeycomb packages or egg trays, and have an anti-slip property, so that eggs in a lying position can also be marked.

According to the invention, this object is achieved by providing a device made of an elastic plastic material for the optical and/or haptic marking of hen's eggs to characterize their properties, which device is at least partly adapted to the outer shape of the egg in a positive locking (form-locking) and/or non-positive locking (force-locking) way.

Sufficient form and/or force locking of the device can be achieved by providing the plastic materials employed with a fraction having elastic properties in the usual operating temperature range of from 0 to 100° C., especially at temperatures of between 3° C. and room temperature.

Thus, the device can optimally conform to the respective egg shape and can be friction-protected against slipping off by a certain tension. This is preferably achieved by using elastomers or suitable thermoplastic materials. Especially thermoplastic elastomers, which in an ideal case possess a combination of the use properties of elastomers and the processing properties of thermoplasts, are optimally suitable for this purpose.

Such plastics may be selected, inter alia, from polyolefins, such as polyethylene and polypropylene, natural rubber, synthetic rubber, such as thermoplastic nitrile and fluororubbers, silicone rubber, polyethers, polyurethanes, polyether block amides, polymers containing styrene or polyesters, and their mixtures, blends and/or copolymers.

The materials mentioned enable a virtually non-slip adhering of the marking caps to the egg without the necessity of using adhesives. This is important especially because egg shells have a high porosity and permeability towards liquid or volatile substances. For the same reason, it is preferred to employ food-safe and/or dishwasher-proof plastic materials.

The devices according to the invention provide the contact with the egg's surface preferably through adaptation to the outer shape of the hen's egg through one or more circular ring areas having optionally equal and/or different diameters, which during use are in contact with the outer surface of the hen's egg at least partly or entirely in a positive locking (form-locking) and/or non-positive locking (force-locking) way.

According to the invention, the marking of the egg characteristics is effected through optical and/or haptic features of the egg device. In one embodiment, this is effected through the outer geometric shape. In another embodiment, the optical and/or haptic marking can be effected through the outer color design. Particularly preferred are various defined colors, color combinations and/or patterns, prints, logos and pictograms from which the condition and/or state properties of the hen's egg are assigned and marked according to a system to be established by the manufacturer or else by the user. This purpose is also preferably served by words and/or characters, Braille signs and/or an inscribable surface. Also, a spherical, cube-shaped or otherwise designed surface may also serve for distinction.

To obtain devices which are as space-saving as possible and which can be employed in any usual egg storage container, they are designed, in particular, in the form of a top-mountable cap or ring, optionally with a regularly or irregularly sinusoidal terminal edge as outlined in FIG. 1. The sinusoidal terminal edge has the particular advantage that a wide variety of egg sizes can be connected in a virtually non-slip fashion with a relatively small contact area of the device with the surface of the hen's egg. In this case, the extensibility of the material can be utilized particularly well.

For example, devices according to the invention are prepared from silicone rubber in various uniform colors (red, green, yellow, black) according to the pattern outlined in FIG. 1, optionally with a sinusoidal edge, at a relatively small egg shape. The devices are positively and/or non-positively locked in a virtually non-slip fashion on hen's eggs of all usual sizes, also in a lying position. The thus marked eggs fit into usual storage containers, such as closable egg honeycomb boxes or closable egg trays in the refrigerator. In this case, for example, the color marking enables a distinction between fresh (yellow), old (red), egg from outdoor keeping (green) and boiled (black).

Figure 2:
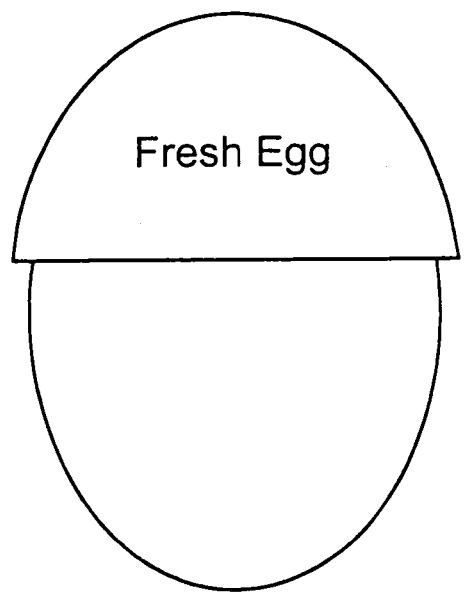

Alternatively, the devices may also be provided with inscriptions (fresh egg, old egg, organic egg, boiled egg) as shown in FIG. 2.

Figure 3:
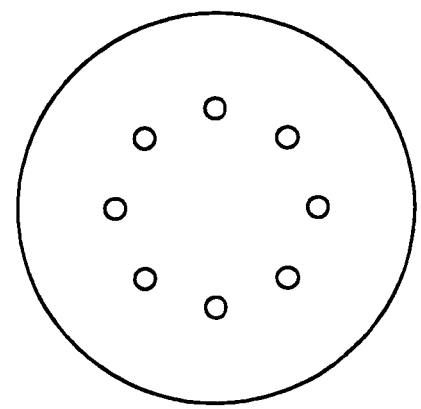

FIG. 3 shows a top view of a device according to the invention with a haptic marking by protrusions.

What is claimed is:

1. A device, having an informational component, made of an elastic plastic material selected from polyethylene, polypropylene, natural and/or synthetic rubber, silicone rubber, their mixtures, blends and/or copolymers for the optical and/or haptic marking of individual hen's eggs to denote their individual properties by placement through virtually non-slip adherence to the egg, which device is adapted so that the egg with the device placed thereon fits into usual egg storage containers and includes an inner concaved or curved surface the entirety of which is adapted to closely conform in continuous uninterrupted contact with at least part of the outer shape of the egg in a positive locking (form-locking) and/or non-positive locking (force-locking) way, whereby the marking of the egg characteristics is effected through optical and/or haptic features of the egg device.

2. The device according to claim 1, characterized in that said plastic material comprises a thermoplastic elastomeric material.

3. The device according to claim 1, characterized in that said plastic material is food-safe and/or dishwasher-proof.

4. The device according to claim 1, characterized in that said adaptation to the outer shape of the hen's egg is effected through one or more circular ring areas having optionally equal and/or different diameters, which during use are in contact with the outer surface of the hen's egg at least partly or entirely in a positive locking (form-locking) and/or non-positive locking (force-locking) way.

5. The device according to claim 1, characterized in that said optical and/or haptic marking is defined by the outer geometrical form.

6. The device according to claim 1, characterized in that said optical and/or haptic marking is defined by the outer color design, especially by the selection of defined colors, color combinations and/or patterns, prints, logos, pictograms, words and/or characters, Braille signs and/or an inscribable surface.

7. The device according to claim 1 in the form of a top-mountable cap and/or top-mountable ring.

8. The device according to claim 7, characterized in that said top-mountable cap and/or top-mountable ring has a regularly or irregularly sinusoidal terminal edge.

9. A set of devices, each device having an informational component, made of an elastic plastic material selected from polyethylene, polypropylene, natural and/or synthetic rubber, silicone rubber, their mixtures, blends and/or copolymers for the optical and/or haptic marking of individual hen's eggs to denote their individual properties by placement through virtually non-slip adherence to the egg, which device is adapted to closely conform with at least part of the outer shape of the egg in a positive locking (form-locking) and/or non-positive locking (force-locking) way through an inner concaved or curved surface, one device including a first indicia to mark an individual property or characteristic, and a second device including a second indicia to denote a second property or characteristic, whereby the marking of the egg characteristics is effected through optical and/or haptic features of the egg device.

10. A set of devices, each device having an informational component, made of an elastic plastic material selected from polyethylene, polypropylene, natural and/or synthetic rubber, silicone rubber, their mixtures, blends and/or copolymers for the optical and/or haptic marking of individual hen's eggs to denote their individual properties by placement through virtually non-slip adherence to the egg, which device is adapted to closely conform with at least part of the outer shape of the egg in a positive locking (form-locking) and/or non-positive locking (force-locking) way through an inner concaved or curved surface, said devices being color coded with one device including a first color to mark an individual property or characteristic, and a second device including a second color to denote a second property or characteristic, whereby the marking of the egg characteristics is effected through optical and/or haptic features of the egg device.

11. A set of devices, each device having an informational component, made of an elastic plastic material selected from polyethylene, polypropylene, natural and/or synthetic rubber, silicone rubber, their mixtures, blends and/or copolymers for the optical and/or haptic marking of individual hen's eggs to denote their individual properties by placement through virtually non-slip adherence to the egg, which device is adapted to closely conform with at least part of the outer shape of the egg in a positive locking (form-locking) and/or non-positive locking (force-locking) way through an inner concaved or curved surface, one device including a first shape to mark an individual property or characteristic, and a second device including a second shape to denote a second property or characteristic, whereby the marking of the egg characteristics is effected through optical and/or haptic features of the egg device.

* * * * *